(12) United States Patent
Sawyer, Jr. et al.

(10) Patent No.: US 7,920,068 B2
(45) Date of Patent: Apr. 5, 2011

(54) DISTANCE CORRECTION FOR DAMAGE PREVENTION SYSTEM

(75) Inventors: Tom Y. Sawyer, Jr., Palisade, CO (US);
Daniel E. Colby, Newark, OH (US);
Senthilnathan Kannan, Westerville, OH (US)

(73) Assignee: Global Precision Solutions, LLP., Grand Junction, CO (US)

( * ) Notice: Subject to any disclaimer, the term of this patent is extended or adjusted under 35 U.S.C. 154(b) by 345 days.

(21) Appl. No.: 12/095,910

(22) PCT Filed: Dec. 5, 2006

(86) PCT No.: PCT/US2006/061623
§ 371 (c)(1),
(2), (4) Date: Oct. 14, 2008

(87) PCT Pub. No.: WO2007/067898
PCT Pub. Date: Jun. 14, 2007

(65) Prior Publication Data
US 2009/0237263 A1 Sep. 24, 2009

Related U.S. Application Data

(60) Provisional application No. 60/742,679, filed on Dec. 5, 2005, provisional application No. 60/742,675, filed on Dec. 5, 2005.

(51) Int. Cl.
*G08B 21/00* (2006.01)
(52) U.S. Cl. ........................................ 340/686.1; 701/50
(58) Field of Classification Search ............... 340/686.6; 701/50
See application file for complete search history.

(56) References Cited

U.S. PATENT DOCUMENTS

| | | | | |
|---|---|---|---|---|
| 5,955,973 A * | 9/1999 | Anderson | ...................... | 340/988 |
| 5,964,298 A * | 10/1999 | Greenspun | ...................... | 172/4.5 |
| 6,282,477 B1 * | 8/2001 | Gudat et al. | ..................... | 701/50 |
| 6,326,887 B1 * | 12/2001 | Winner et al. | ................ | 340/435 |
| 6,370,475 B1 | 4/2002 | Breed et al. | | |
| 6,778,092 B2 | 8/2004 | Braune | | |
| 7,069,146 B2 * | 6/2006 | Yamamura et al. | ........... | 701/301 |
| 2005/0143918 A1 * | 6/2005 | Hilliard et al. | ................ | 701/301 |

OTHER PUBLICATIONS

International Search Report and Written Opinion for corresponding PCT Application No. PCT/US06/61623 dated Mar. 14, 2008.

* cited by examiner

*Primary Examiner* — George A Bugg
*Assistant Examiner* — Kerri McNally
(74) *Attorney, Agent, or Firm* — Christie, Parker & Hale, LLP (57) ABSTRACT

A system and method for determining a distance of a utility asset from a moving equipment. The invention determines a first current location of the equipment; accesses stored coordinates for a plurality of utility assets; selects an area of interest including a portion of the plurality of utility assets; identifies local utility assets in the selected area; determines a utility asset nearest to the first current position of the equipment, from the local utility assets; determines velocity and direction of the moving equipment; and determines the distance from the nearest utility asset to the second current location of the equipment responsive to the determined velocity and direction of the equipment. The invention may then generate a warning indication responsive to the determined distance.

5 Claims, 11 Drawing Sheets

DISTANCE CORRECTION FOR DAMAGE PREVENTION SYSTEM

CROSS-REFERENCE TO RELATED APPLICATION

This U.S. patent application claims the benefit of the filing date of International Application No. PCT/US2006/061623, filed Dec. 5, 2006, which claims the benefit of the filing date of U.S. Provisional Application Nos. 60/742,675, filed Dec. 5, 2005 and 60/742,679, filed Dec. 5, 2005, the entire contents of which are hereby incorporated by reference.

TECHNICAL FIELD

This application relates to a system and method for distance correction for damage prevention systems.

BACKGROUND

A damage prevention system may be used to protect and avoid various assets that may be located above ground and/or below ground. Such assets include, for example, utility lines and components and protected areas, such as archeological sites and habitat of endangered species. There are millions of miles of utility lines around the world, some buried and some above ground. These utility lines include, without limitation, electric power lines, telephone lines, water lines, sewer lines, fiber-optic cable lines, natural gas transmission lines, natural gas distribution lines, and utility lines for transporting hazardous liquids. The location of a utility may be acquired by underground imaging, which may be accomplished by the use of ground penetrating radar or other means.

SUMMARY

The invention relates to damage prevention of assets in a damage prevention system. The damage prevention system may incorporate visual and audio presentation of warning signals to warn a user about potential risk to existing assets, for example, during digging and earth-moving activities. The system and method of the present invention, determines when and if utility or other types of assets are about to be damaged and accordingly, displays a warning indication.

In one embodiment, the present invention is a system and method for determining a distance of a utility asset from a moving equipment. The invention is configured to determine a first current location of the equipment; access stored coordinates for a plurality of utility assets; select an area of interest including a portion of the plurality of utility assets; identify local utility assets in the selected area; determine a utility asset nearest to the first current position of the equipment, from the local utility assets; determine velocity and direction of the moving equipment; and determine the distance from the nearest utility asset to the second current location of the equipment responsive to the determined velocity and direction of the equipment. The invention may then generate a warning indication responsive to the determined distance.

BRIEF DESCRIPTION OF THE DRAWINGS

These and other features, aspects and advantages of the present invention will be more fully understood when considered with respect to the following detailed description, appended claims and accompanying drawings, wherein:

In accordance with common practice the various features illustrated in the drawings may not be drawn to scale. Accordingly, some of the drawings may be simplified for clarity. Thus, the drawings may not depict all of the components of a given apparatus or method.

DETAILED DESCRIPTION

In some embodiments, a damage prevention system constructed in accordance with the teachings herein may perform a combination of precisely locating assets, such as, utility lines and components, that are either underground or above ground by measuring and recording the positional coordinates provided by a precision global positioning system (GPS) and merging that data with a proprietary digital grid process (e.g., stored in a database or other data memory).

The grid may then be used by a damage prevention system associated, for example, with equipment being operated to determine whether there are any utilities in the area that could potentially be damaged by the equipment. For example, as illustrate in FIG. 1 a piece of equipment (e.g., a bulldozer) 102 may be digging in an area that is close to a buried utility asset (e.g., a pipeline as represented by the dashed lines 104).

The damage prevention system may incorporate visual and audio presentation of warning signals (discussed below) to warn the system user (e.g., the equipment operator) about potential utility hazards during digging and earth-moving activities. In some embodiments these warning signals may be displayed at four distinct levels: SAFE, CAUTION, WARNING and DANGER. The precision damage prevention system's warning functions may rely on the GPS receiver's physical geographical coordinate position and measuring it against a calculated Nearest Target Record (NTR) from the grid when displaying real-time warnings. Here, the NTR may represent, for example, the closest utility to the equipment being operated.

In some embodiments, the system relies on a number of distinct items to determine when and if a warning indication is displayed. For example, when measuring and displaying the NTR warnings, the system may measure and display: the operator's GPS receiver coordinate position; the NTR coordinate position; the GPS receiver's direction of travel; the speed of travel; the distance to the potential NTR conflict; and the time to impact the NTR. (assuming the system continues its current course).

In general, the displayed warning (or any other warning) depends on the precision of the data and the processing of these calculated data values. When the GPS receiver is in constant movement, the velocity of the receiver changes. This, in turn, may affect the validity of warnings and the times that they are presented to the application screen. For example, traveling at relatively low speeds (e.g., 0-2 miles per hour) has little effect on the system.

However, at higher velocity, the warning times and audio presentations may be significantly effected. For example, in FIG. 1 a system may make a warning calculation based on the position P1 of the equipment 102 relative to an NTR. Here, the system may calculate a distance D1 between the equipment 102 and the nearest point 106 of the (utility) asset 104. Based on this distance, the system may determine that there is no need to generate a warning (or switch to a more serious warning).

Figure 1:
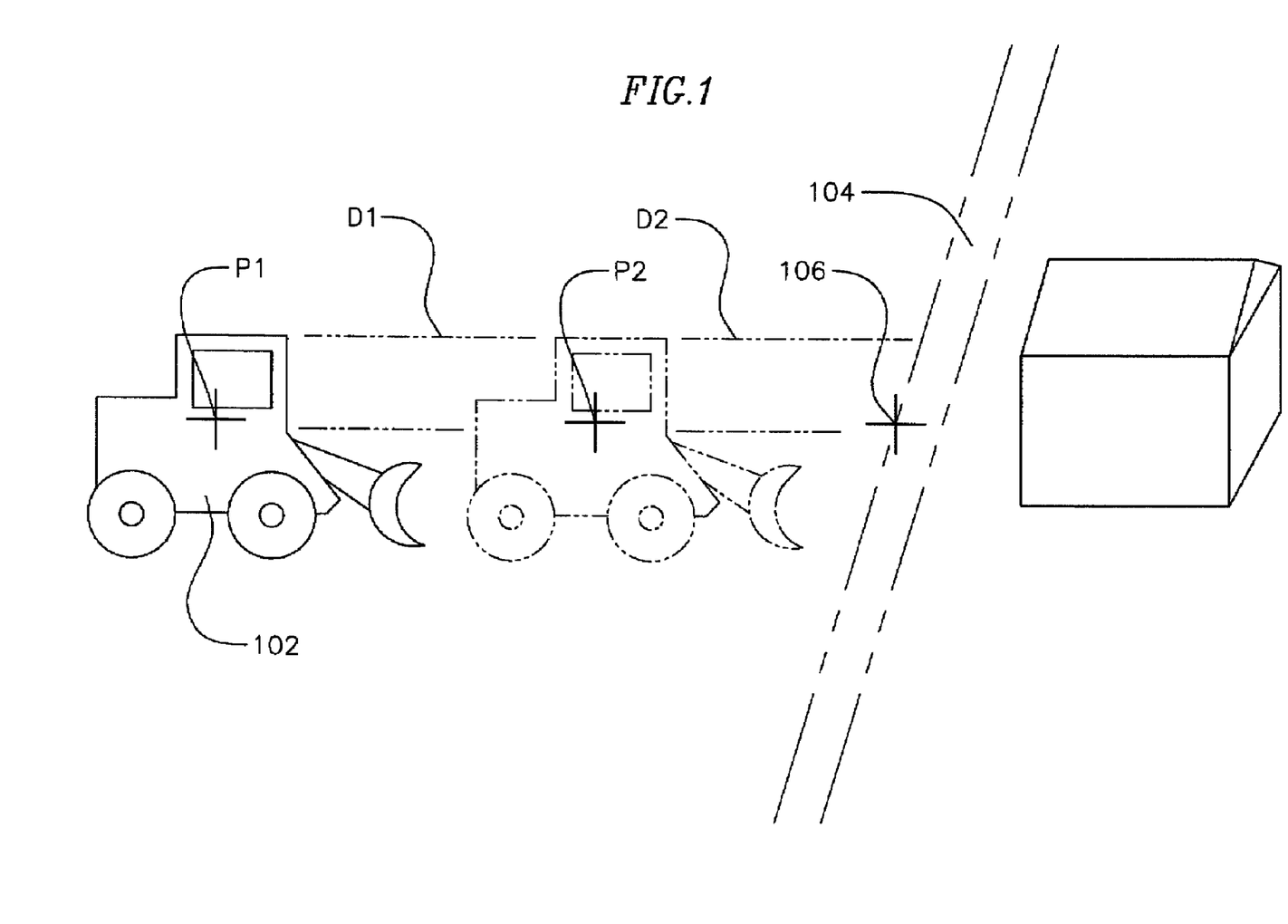
FIG. 1 shows an example of an equipment (a receiver) and a buried utility asset, in accordance with an embodiment of the present invention.

If the equipment 102 is moving at a relatively high rate of speed, however, the equipment 102 may actually be at location P2 when the system finishes the NTR calculation. In this case, the actual distance to the utility is D2, not D1. Thus, if the movement of the equipment is not addressed or handled properly, the real-time warning displays may be inaccurate.

The processing time it takes for the computer system to perform the processes involved in the above calculations depends on the computer's processing speed. When traveling at higher rates of velocity, the difference in processing speed extrapolates over time and distance and, consequently, may result in the warnings signals lagging the actual real-world time. Accordingly, it may be crucial to take equipment movement and processing speed into consideration when computing the NTR when the equipment is moving at higher rates of speed.

In some embodiments an NTR distance correction (NTRDC) system and method rely on a number of factors. These factors include: 1) the position of the receiver relative to the NTR; 2) the velocity of travel; and 3) the processing time the system needs to perform the warning calculations. Typically, this processing time is relatively short and may range, for example, anywhere from a tenth of second to a thousandth of a second, depending upon the processing speed of the computer. When the receiver is traveling at high velocity (e.g., 60-80 mph), this difference can affect the accuracy of the NTR time to target based on the distance. In some embodiments, to account for this the system performs some optimization calculations to maximize the accuracy and validity to match the velocity. For example, an actual NTR may be computed according to the following:

$$\text{Actual NTR} = \text{NTR}_{Theoritical} + \text{NTR}_{Correction} \quad (1)$$

$$\text{NTR}_{Correction} = |(\Delta t^* V) \cdot (\text{NTR})| / |(\text{NTR})| \quad (2)$$

Where $\Delta t$ is the processing time that may be measured from the moment the application receives the signal from the GPS receiver (equipment) to the moment it actually computes the NTR distance, and V is the velocity (vector) of the receiver (equipment).

The receiver provides the speed, which is the magnitude component of the velocity. In some embodiments the direction component of the velocity may be computed based on the previous receiver's coordinate position. In some embodiments the system may assume that the change in direction between consecutive GPS reading (e.g., one second) is negligible. In other words, it may be assumed that the GPS receiver (e.g., equipment including the GPS receiver) will not make any sudden turns at high speeds within a time span of one second.

Table 1 indicates the influence of the $\Delta t^*V$ component of the NTR at various velocity levels assuming that the $\Delta t$ is set to 0.1 sec. In this example, V is assumed to be in the direction of NTR when $\Delta t^*V$ is positive and maximum. There may be times when V is in the direction perpendicular to NTR direction in which case the component $\Delta t^*V$ is zero. If V is in the direction exactly opposite to NTR direction then $\Delta t^*V$ is negative and minimum.

TABLE 1

| $\Delta t$ (sec) | V (ft/sec) | | $\Delta t^*V$ (ft) |
|---|---|---|---|
| 0.1 | 29.33 | (20 miles/hr) | 2.933 |
| 0.1 | 58.66 | (40 miles/hr) | 5.866 |
| 0.1 | 88 | (60 miles/hr) | 8.800 |
| 0.1 | 117.33 | (80 miles/hr) | 11.7330 |

Table 1 illustrates that at high-velocity the $\Delta t^*V$ component may have a significant impact on the actual NTR distance.

Figure 2:
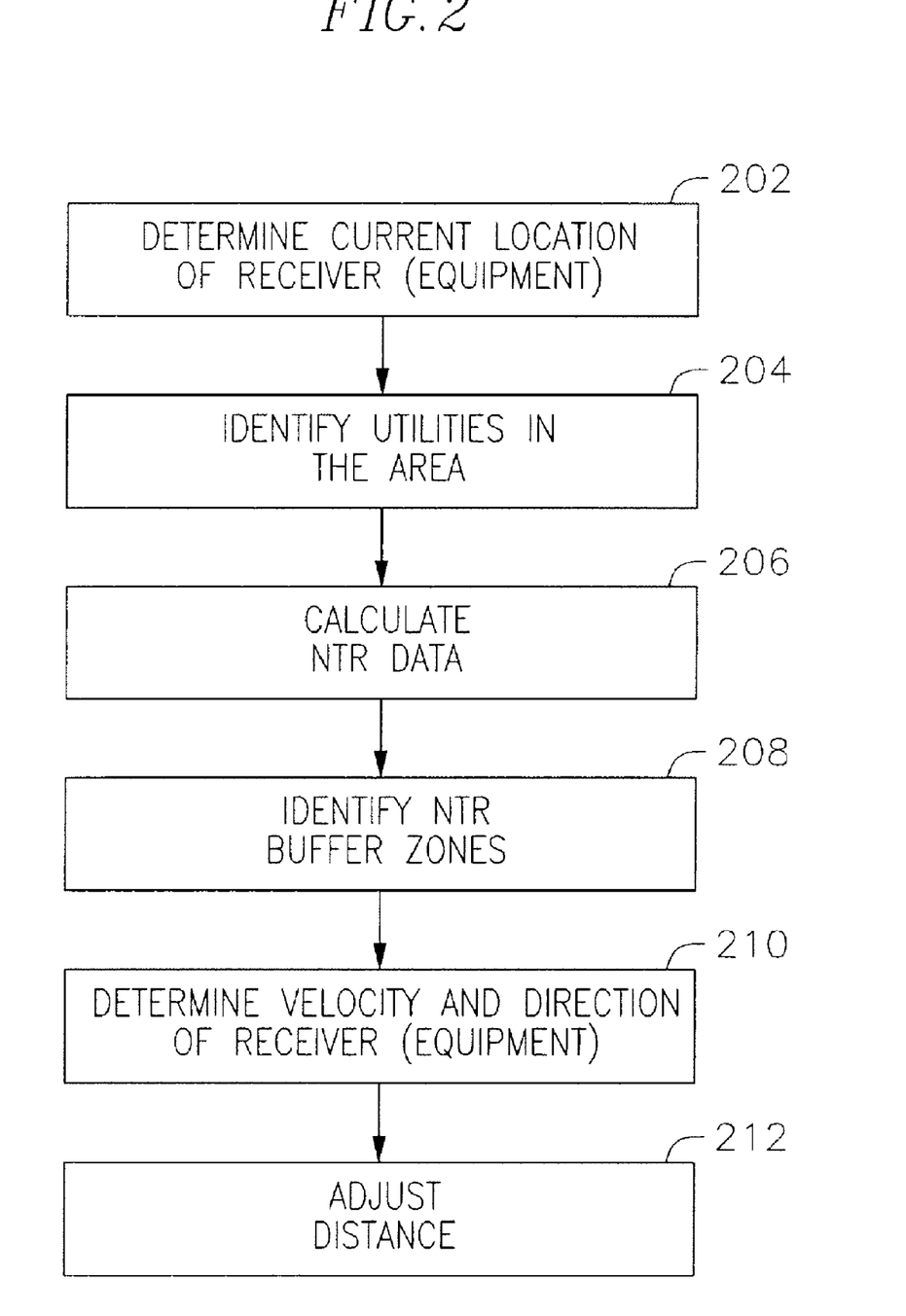
FIG. 2 illustrates an exemplary process flow for compensating for the speed and direction of an equipment, in accordance with an embodiment of the present invention.

FIG. 2 illustrates an exemplary process flow for compensating for the speed and direction of an equipment, in accordance with an embodiment of the present invention. As represented by block 202, the system commences collecting GPS data to determine the current location of the equipment. In block 204, the system may identify any utilities in a selected area, for example, a grid of a size designated or selected by a particular application. In one embodiment, the area may be selected from a list of different localities or an area from a displayed map (on a computer screen) can be selected by a user. At block 206 the system accesses the database and calculates NTR data. In conjunction with this process, the system may identify or establish one or more buffer zones (e.g., distance for each warning level) associated with each utility in the vicinity of the equipment, as shown in block 208. In block 210, the system detects the velocity and direction, if any, of the equipment based on two different locations of the receiver, for example, a previous location and the current location of the receiver and. In block 212, the system then adjusts the distance of the NTR to the equipment (taking into account buffer zones, if any) to account for the movement of the equipment and the processing time. In other words, a new distance to the NTR is determined based on the movement of the equipment and the processing time. If the distance in being displayed to the user (e.g., the equipment operator), the distance is also adjusted on the display.

In view of the above, it should be appreciated that a variety of techniques may be used to compensate for velocity and/or processing time in a damage prevention system. For example, adjustments may be made to calculated distance (e.g., between a leading edge of the equipment and the nearest point of the utility), calculated times (e.g., time to impact) or other criteria.

Also, it should be appreciated that the teaching herein may be applicable to other types of damage prevention systems. For example, a system may use techniques other than GPS signals to determine the velocity and/or direction of a piece of equipment. For example, velocity sensors, accelerometers, radar, etc., may be incorporated into a system.

A variety of techniques may be used to determine the processing time. For example, the time may be measured in real-time, previously measured, estimated, calculated using simulations, etc. As an example of real-time measurements, in some embodiment the system may start a timer when the GPS location data is collected (e.g., block 202). The timer may then be stopped when the distance (or impact time) to the NTR is calculated (e.g., block 208).

These and other aspects of a warning correction system will now be described in the context of a damage prevention system that incorporates precision integration. It should be appreciated that the following is but one example of an application of a system as taught herein. Accordingly, the teachings herein may be applicable to a variety of applications including applications other than those explicitly described here.

Highly accurate information products and applications for field use have been developed for utility asset management or utility damage prevention as described in U.S. patent application Ser. No. 11/185,579, filed Jul. 19, 2005, issued as U.S. Pat. No. 7,482,973, the disclosure of which is hereby incorporated by reference herein. Here, some embodiments produce an information product, called a Precision Integration (PI) Grid that is comprised of (above or below ground) utility location data combined with a GIS Landbase that includes satellite and/or other imagery and mapping information.

In some embodiments, the PI Grid advantageously provides the utility location data accurate to within few centimeters (e.g., 10 centimeters), without using real-time kinetics (RTK), and within millimeter accuracy using RTK. Some embodiments also provide for the accurate recall of the information based on the generation of data using precision GPS technologies that provide absolute, as opposed to relative, position data. Here, the term precision GPS refers to a GPS system that may provide position information with accuracy as set forth herein for PI. Utility location information may be recalled anywhere, anytime in the world with the above mentioned accuracy.

Such a system may be used for all phases of underground utility management, from initial planning and engineering, through construction and life-cycle maintenance. Utility data may be accurately located and captured or collected by a data logging application using precision GPS technologies. The resultant data, as a PI Grid, may be used in a damage prevention (damage avoidance) application by a damage prevention module which warns users of the proximity of above or below ground utilities in order to avoid damage due to conflict.

In some embodiments, a component of the development of location data with the aforementioned accuracy and recall is Precision Integration (PI). In one aspect PI is a methodology and process and technology used to assure that data points at each step of the information product development are captured using precision GPS and integrated into the information product in a manner that produces data of the accuracy previously described.

In some embodiments, Precision Integration (PI) involves the use of an X, Y coordinate, and sometimes also a Z coordinate (e.g., altitude or depth), signal having a horizontal (X, Y coordinate) accuracy within 10 Centimeters (within 4 inches) without RTK and millimeter accuracy with RTK and vertical (Z coordinate) accuracy within 15 centimeters without RTK. This accuracy may be provided in collecting utility location data and in creating a GIS database, called a PI Landbase, that are combined in various steps of the system to provide a PI Grid that in combination substantially implements the PI process.

Accordingly, collected utility location information may be accurate to within ten centimeters without RTK and within millimeters when using RTK. As used herein, the term precision location may be defined as being within ten centimeters without RTK and within millimeters when using RTK. A precision GPS system that may provide the accurate coordinate reference signal is manufactured by NavCom Technologies™, Inc., under the name the StarFire™ Differential Global Positioning System.

In some embodiments, PI also involves the use of the accurate signal in creating a movable map that is displayed to show the accurate position of the data logger or other data collection or data usage device (e.g., damage prevention module) and the user in relation to the PI Landbase. For example, as a display device (e.g., a computer-based system) is moved (changes position) or turns (changes direction) the displayed image may change accordingly (e.g., keeping the computer in the middle of the project area and orientating the project area so that it "faces" the same direction as the person or equipment). This presentation method and technology may be referred to herein as Real Time Imagery (RTI).

The data logger and the damage prevention module may utilize RTI and may provide real time visual location in the context of a project area map enhanced with photo imagery of the project area. During utility data gathering the data collector can see where he is on the map, and verify the locations that he is taking against identifiable landmarks (e.g., as seen and as represented on the display). In some embodiments, the data logger (DL) utilizes RTI as a major component of its data collection application. RTI may be used to present the project area including aerial imagery for location 'sanity checks' and show the location of the user as he or she moves around the project area. RTI may show, in real-time, data points that are collected and symbology and other meta-data attributes that may be associated with collected data. RTI may provide real-time feedback, and validation, and by facilitating 'eyes on the ground validation' may significantly increase data accuracy. Using RTI, data collectors may validate 'where they are' in a project area and validate that the data they are collecting is the 'correct data.'

In some embodiments, a data set is developed which, after meeting project criteria, is designated or certified as a PI Grid. The PI Grid designation or Certification may be significant in that it may indicate to the project manager that the PI Grid meets project criteria for the use of the data in damage prevention or other utility asset management applications. The PI Grid may be presented to the user, via a computer screen, or a display as a sophisticated, intuitive, project area map that provides utility location information superimposed on imagery of the project area (e.g., a visual representation of an overhead view and other indicia).

The PI Grid also may be presented as a movable map that directionally turns with the movement of the person or equipment to which the computer is attached or carried. As a user walks or rides around a project area the PI Grid, presented in RTI, may move and indicate the location of the user (e.g., via a visual representation) within the project area, while simultaneously showing the location of utilities (e.g., via a visual representation) within user defined utility location buffer areas. Utility information may be viewable in reference to imagery of the related or project area, in real time providing the current position of equipment or personnel relative to the location of utilities and may be viewable as the person or machine moves in any direction. The capability of presenting PI Grid data in this useable, real time mode provides project managers with real time utility location data that is accurate and actionable per the operational requirements of the project manager.

The use of RTI may be particularly advantageous for damage prevention. The damage prevention module (DPM) may utilize RTI to provide real-time utility location data to operators of ground penetrating equipment to avoid damaging utilities. During damage prevention usage real time visual location and utility 'closeness' warning feedback may be provided to an individual or to equipment on which the module is placed. The DPM may provide sophisticated targeting and 'lock on' capabilities that utilize user defined buffers to warn equipment operators of utilities that could be damaged by ground breaking activities.

In some embodiments, an imaging system displays an image that includes a portion of a larger image. In one aspect, the image is based on a grid coordinate system. For example, the image may be defined by an X-Y-Z coordinate system. Each location in the image (e.g., a specific X-Y-Z coordinate) may then be associated with certain characteristics. For example, the image may represent the surface of the earth including man-made or other objects. In this case, the image may include images of visible objects such as the landscape, building and roads and images representing non-visible objects such as buried utility lines. Consequently, each location in the image may define a portion of the image. In this way the entire collection of the characteristics of each location (e.g., coordinates) defines the entire image.

In some embodiments, the location characteristic information may be stored in a database or some other form of memory. In this way, any portion of the image may be displayed by accessing the information associated with all of the locations (e.g., coordinates) within the selected portion of the image. That is, the information from the database may be provided to an imaging system that processes the information to cause a visual representation of the image to be displayed on a display device.

Figure 10:
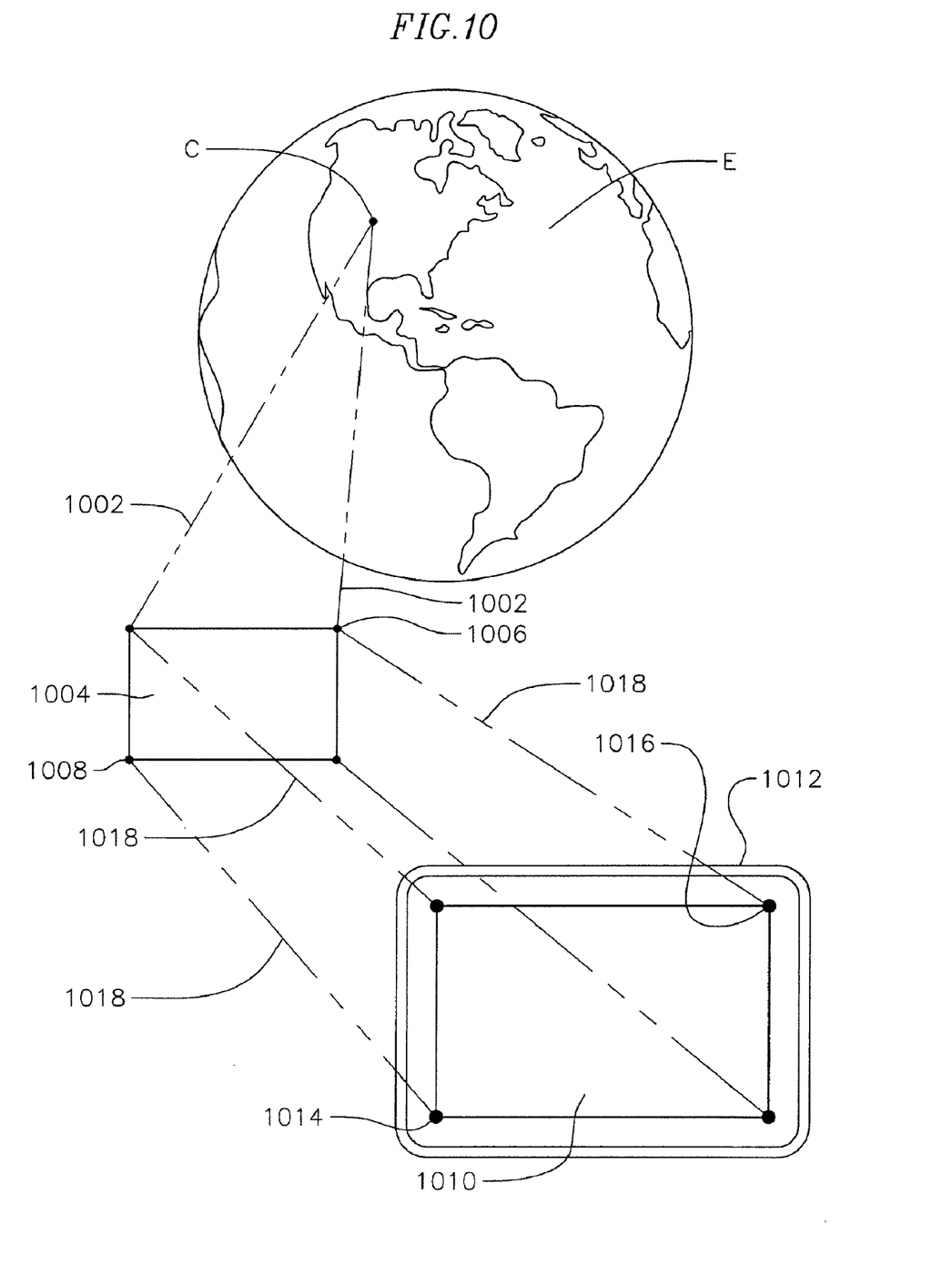
FIG. 10 is an exemplary image of a large area, in accordance with an embodiment of the present invention.

In some embodiments, the larger image is associated with a very large area. For example, the larger image may represent a relatively large portion of the surface of the earth or the entire surface of the earth B as shown in FIG. 10. In this case, a relatively large coordinate system may be used to define locations within the image. For example, in some embodiments the image may be associated with GPS coordinates. That is, each location in the image may be identified by a GPS coordinate.

In some applications, it is desirable to display only a relatively small portion of a larger image. For example, it may be desirable to display a city or a city block (represented by area C in FIG. 10) from the larger image E. The area C is associated with a subset of the coordinates from the area E. For example, as represented by the dashed lines 1002, the area C may be represented by a grid of coordinates 1004. For convenience only the upper-right-most coordinate 1006 and the lower-left-most coordinate 1008 are labeled in FIG. 10.

In some applications, the relatively large coordinates used to identify the larger image may be relatively incompatible with the coordinates typically used to display an image on a relatively small screen 1010 of a display device (e.g., a computer monitor) 1012. For example, GPS coordinates are large enough to define an area on the order of 150 million square kilometers. In contrast, it may be desirable to display an image having an area on the order of a few hundred square meters.

Moreover, some systems define images with a relatively high degree of accuracy. For example, an image may be defined in GPS coordinates with accuracy on the order of a millimeter. Accordingly, a coordinate may include a relatively large number of digits for the integer part of a decimal value (left of the decimal point) and a relatively large number of digits for the fractional part of the decimal value (right of the decimal point). However, conventional imaging systems may have difficulty in registering raster and vector values of such magnitude and accuracy.

In some embodiments, an imaging system may effectively display a portion of a large image by mapping (registering, transforming, etc.) the coordinates from the larger image into coordinates that correspond to the smaller image to be displayed. For example, an origin (e.g., coordinate 1008) may be defined in the smaller image 1004 and all coordinates (e.g., coordinate 1006, etc.) in the smaller image may be referenced to that origin. In some embodiments, this referencing may be accomplished by subtracting the coordinate values of the origin from the coordinate values of each coordinate. The resulting coordinate difference values may then be used to reference each coordinate (e.g., coordinates 1014 and 1016) in the image to be displayed. Here, each coordinate is referenced to the origin. In this way, as represented by the lines 1018, all of the coordinates (e.g., coordinates 1006, 1008, etc.) from the area 1004 may be mapped to the coordinates (e.g., coordinates 1014, 1016, etc.) used to display the image on the screen 1010.

These and other aspects of an imaging system will now be described in the context of a damage prevention system that displays an image of a selected geographical area. It should be appreciated that the following is but one example of an application of an imaging system as taught herein. Accordingly, the teachings herein may be applicable to a variety of applications including applications other than those explicitly described here.

Briefly summarizing, the process relates to the combination of precisely locating assets, such as, utility lines and components, that are either underground or above ground by measuring and recording the positional coordinates provided by an accurate (precision) GPS system and merging that data with a proprietary digital grid process. In some embodiments, the process also entails the registering of raster and vector data into a Precision Application Environment (PAE) that is implemented utilizing, for example, a Scalable Vector Graphics (SVG) software application engine, utilizing a Graphic Markup Language (GML) within a JAVA and Extended Markup Language (XML) environment. This combination of PI Grid and PAE may substantially implement Precision Integration (PI).

As discussed above, PI involves the precise collection, manipulation and visual presentation of data points with millimeter accuracy within the PAE. Presentation of these precision points may be made utilizing real world coordinate projections such as State Plane or UTM projections. UTM projections are traditionally projected in units of meters, while State Plane coordinates are typically projected in feet and/or meters.

To display these precision points accurately on the system, the coordinate values include decimal precision. To display and collect data with millimeter accuracy, projections that are projected in feet may have 4 decimal places to right or greater, whereas in a meter projection, the decimal places may be equal 6 places or greater. For example: 1.0001 feet=millimeter accuracy. Meter units require 6 decimals to achieve the same level of accuracy since that they cover a wider area. (1 meter=3.28 feet).

In State Plane coordinate projections, the X value is projected into 7 numeric digits (left of the decimal) and the Y value is projected into 6 numeric digits (left of the decimal). In order for the X coordinate to and Y coordinate to be millimeter precise in feet, 4 decimal places are added to the right. For example, X=1234567.1234, Y=123456.1234. In meters, 6 decimal places are added to the right in order to achieve the same millimeter level of accuracy. For example: X=1234567.123456, Y=123456.123456.

X coordinate values collected in these projections contain large 7 digit numeric values (million number+decimals). However, a problem may arise in the SVG canvas when registering raster and vector values of this magnitude. Conventionally, the SVG canvas is not designed to handle or register large numeric values to the canvas grid. When such values are presented to the SVG canvas, the rendering of vector lines and points are construed to make it fit the SVG canvas. When this occurs, the vector and linear segments may be displayed on the wrong grid line resulting in a corrupt or misleading display of the elements.

To resolve issues such as this, precise GPS coordinates may be transformed (e.g., registered, mapped, etc.) into smaller manageable numeric digits for enhanced computer processing. As discussed above, SVG displays inherently may not handle nor assign pixels to associate with large numeric numbers (million numbers). Accordingly, the process simplifies the grid to handle the coordinates for pixel display accuracy. The process includes an process (algorithm) designed to accommodate large precision coordinates and making them manageable within the SVG pixel environment. The process may be utilized in real-time precise GPS mapping, navigation, and damage prevention utilizing a precise GPS system.

Figure 11:
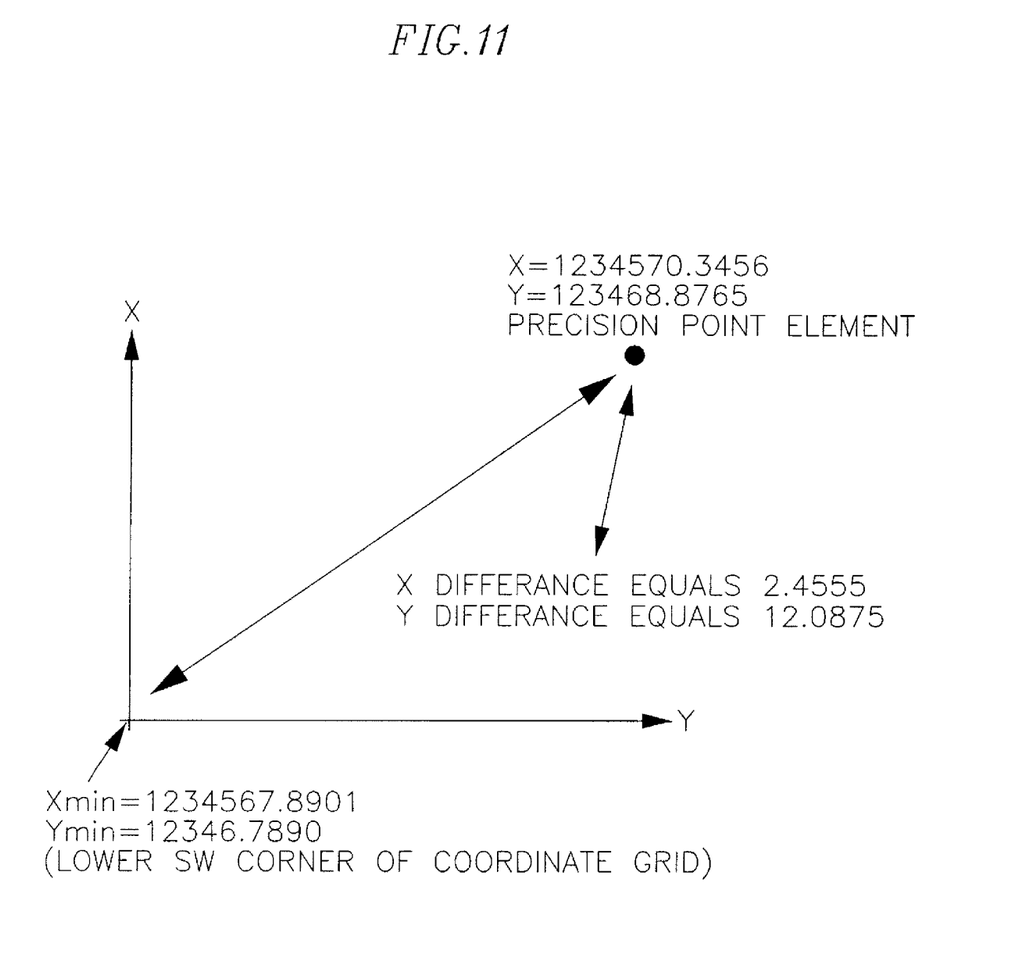
FIG. 11 is an example of a coordinate grid, in accordance with an embodiment of the present invention.

In some embodiments, the process uses the following variables:

FC (File Coordinate);
X and Y Axes which identifies the element coordinate (point or line);
Xmin, Ymin equals the State Plane Feet (SPF) X,Y Axes Origin (Southwest corner of the visual Coordinate Grid).

In some embodiment the formula may be represented as:

$$FC\ X,Y: (FC)X=(SPF)X\ minus(-)(SPF)X min, \quad (3)$$

$$(FC)Y=(SPF)Y\ minus(-)(SPF)Y min \quad (4)$$

This calculated result is stored in the XML Data String as the FC coordinate.

For example, as shown in FIG. 11, if a coordinate for SPF Xmin=1234567.8901 and Ymin=123456.7890 and a precision point element coordinate is defined as X=1234570.3456 and Y=123468.8765 the stored pixel coordinate is calculated to equal FC X=2.4555, FC Y=12.0875. The coordinate is defined on the visual Coordinate Grid at pixel x=2.4555, y=12.0875.

Accordingly, the process involves: 1) identifying the x and y axes; 2) identifying the origin of the Coordinate Grid; 3) identify x and y coordinates of a precision point; and 4) subtracting the point from the origin. This creates a unique identifier grid point for display purposes within the SVG environment.

When the coordinates are displayed on the screen the process reverses itself as follows.

$$SPF\ X,Y: (SPF)X=(FC)X\ plus(+)(SPF)X min, \quad (5)$$

$$(SPF)Y=(FC)Y\ plus(+)(SPF)Y min \quad (6)$$

The above process may provide several advantages. For example, the (FC) coordinates are managed in with a numeric factor that may improve the processing of coordinates within the SVG environment. The (FC) calculated values are unique with each point and cannot be duplicated across the system or grid. The (FC) calculated values are transparent and are only used for application processing and are not visible to the end user.

Referring now to FIGS. 3-6, an embodiment of a damage prevention system is discussed in more detail. The damage prevention system consists of three parts; two of which may typically be housed in the same housing. The three parts are apparatus and method for collecting data, apparatus and method for manipulating the data to put it into a standardized form and the apparatus and method for using the data on equipment to prevent damage by the equipment or to minimize damage to the equipment Precision (e.g., within 10 centimeters, without using real-time kinetics (RTK), and within millimeter accuracy using RTK) asset location data may be created by the apparatus and method of this invention. In particular, FIG. 3A shows an apparatus and method that provides a precision location of the asset, such as a utility line, as it is being placed in the earth. A permanent record of this precision location is based on latitudinal and longitudinal coordinates that are stored for later use. A precision GPS receiver 310 provides the precise latitudinal and longitudinal coordinates for the asset position recorder 311 while the utility line is being placed in the ground. An asset position recorder 311 that may be used during construction to record the position of an asset, such as a utility line as it is being placed underground, is disclosed in U.S. patent application Ser. No. 10/714,091, filed Nov. 13, 2003, the disclosure of which is hereby incorporated by reference herein.

Figures 3, 3A, 3B, 3C:
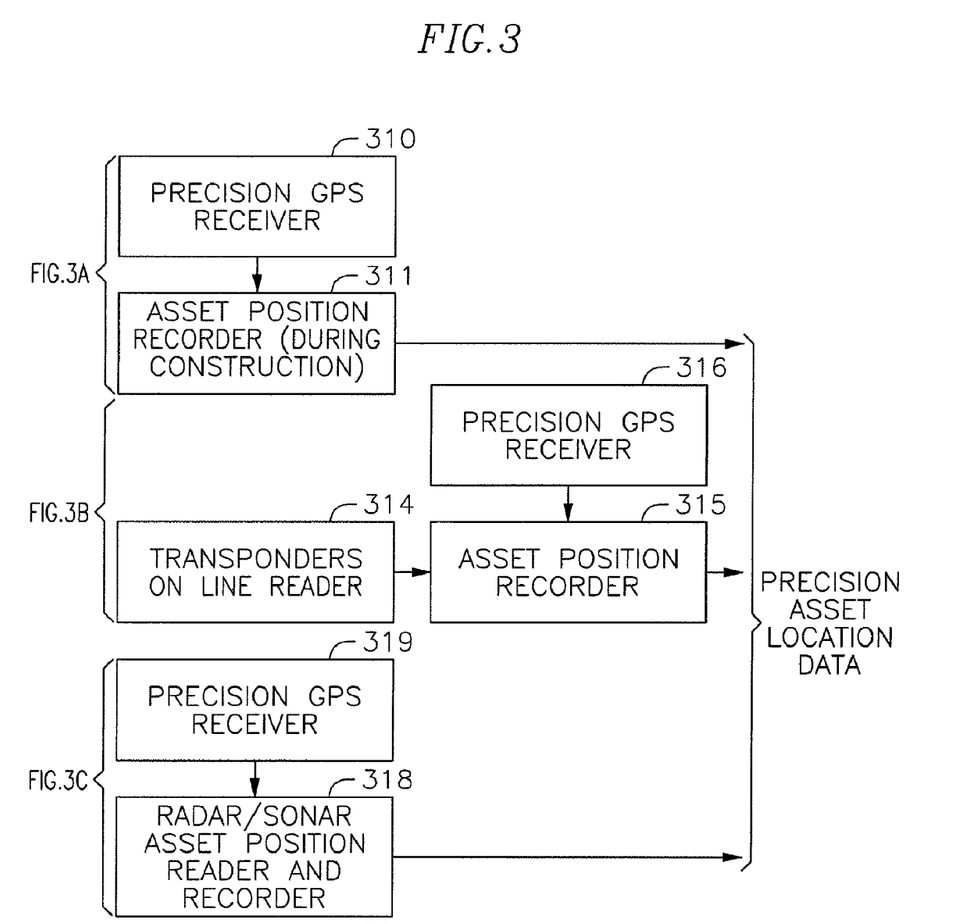
FIG. 3 is a simplified flow diagram illustrating one embodiment of data collection, in accordance with an embodiment of the present invention.
Figure 3D:
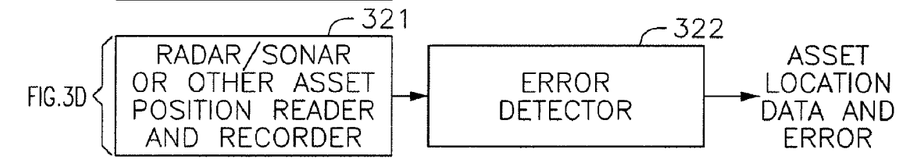
Figure 3E:
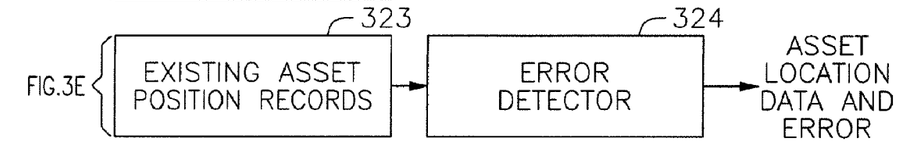

Another approach for creating a permanent record of the precise location of assets, such as utility lines underground, is shown in FIG. 3B. In this approach transponders are placed on the utility line as it is being placed in the ground. Thereafter, when the location of the utility line is to be recorded, a transponder-on-line reader 314 is moved along the ground to locate the transponders that are on the utility line. As the transponders are read, the position of the transponders, and therefore the utility line, is recorded by the use of an asset position recorder 315 and a precision GPS receiver 316 that is coupled to the recorder 315. The precision GPS receiver 316 may be the same receiver as the GPS receiver 310 of FIG. 3A. The output of the asset position recorder 315 may be an ASCII stream having fields for the latitudinal coordinates, the longitudinal coordinates and the identification of the underground asset. The placing of transponders on utility lines and the later reading of the transponder to produce a record of the location of the transponders and thus the utility line are disclosed in U.S. patent application Ser. No. 10/359,446 filed Feb. 4, 2003, the disclosure of which is hereby incorporated by reference herein.

The two above-described apparatus and method for producing precision asset location data involve the recording of the location during construction while the asset is being placed underground or recording the output of transducers that have been placed on the asset, such as the utility line. Many areas do not have any information as to the location of assets such as utility lines that are underground in the area. An effective way of determining the location of such assets and permanently recording the location for later use is the apparatus that is shown in FIG. 3C. This apparatus includes a radar/sonar asset position reader and recorder 318 coupled to and controlled by a precision GPS receiver 319. This GPS receiver 319 may be the same as the GPS receiver 310 of FIG. 3A. Reader and recorder 318 includes an antenna array for transmitting radar and sonar signals into the ground and recording the return signals for locating any assets, such as utility lines, that are underground. This apparatus and method provides a measurement and record of the depth of the utility as well as the longitudinal and latitudinal coordinates of the location of the utility. Further, the reader and the recorder 318 determines and records the size and material of the pipe or conduit of the utility, such as gas pipes, communication lines, water lines and so forth. The output of the reader and recorder 318 may be an ASCII stream with fields for the longitudinal coordinate, latitudinal coordinate and identification of the asset or utility that is underground at the precise location.

There are various devices for locating utilities and recording the location of these utilities such as radar/sonar readers and ground penetrating radar readers. However, the records created by these readers may have the location of the underground asset or facility as much as 15 feet away from the actual location. Thus, if this information is to be used in a precision damage control system, it is necessary to determine the extent of error and correct for this error when the data is employed. Apparatus for employing the records of earlier readers and recorders 321 is shown in FIG. 3D. The output of the reader and recorder 321 passes through an error detector which develops an error correction signal that is coupled to the data and is used in correcting the location of the asset when the data is employed in a damage control system. Further, there are some existing asset position records that have been created when the utility or asset has been placed in the ground. These records also may not be accurate in the location of the asset. Consequently, the difference between recorded location and actual location may be determined as shown in FIG. 3E of FIG. 3. An error detector 324 is coupled to the output of existing asset position records medium 323 for developing an error correction signal to be coupled to the data for use by a damage control system.

Figure 4:
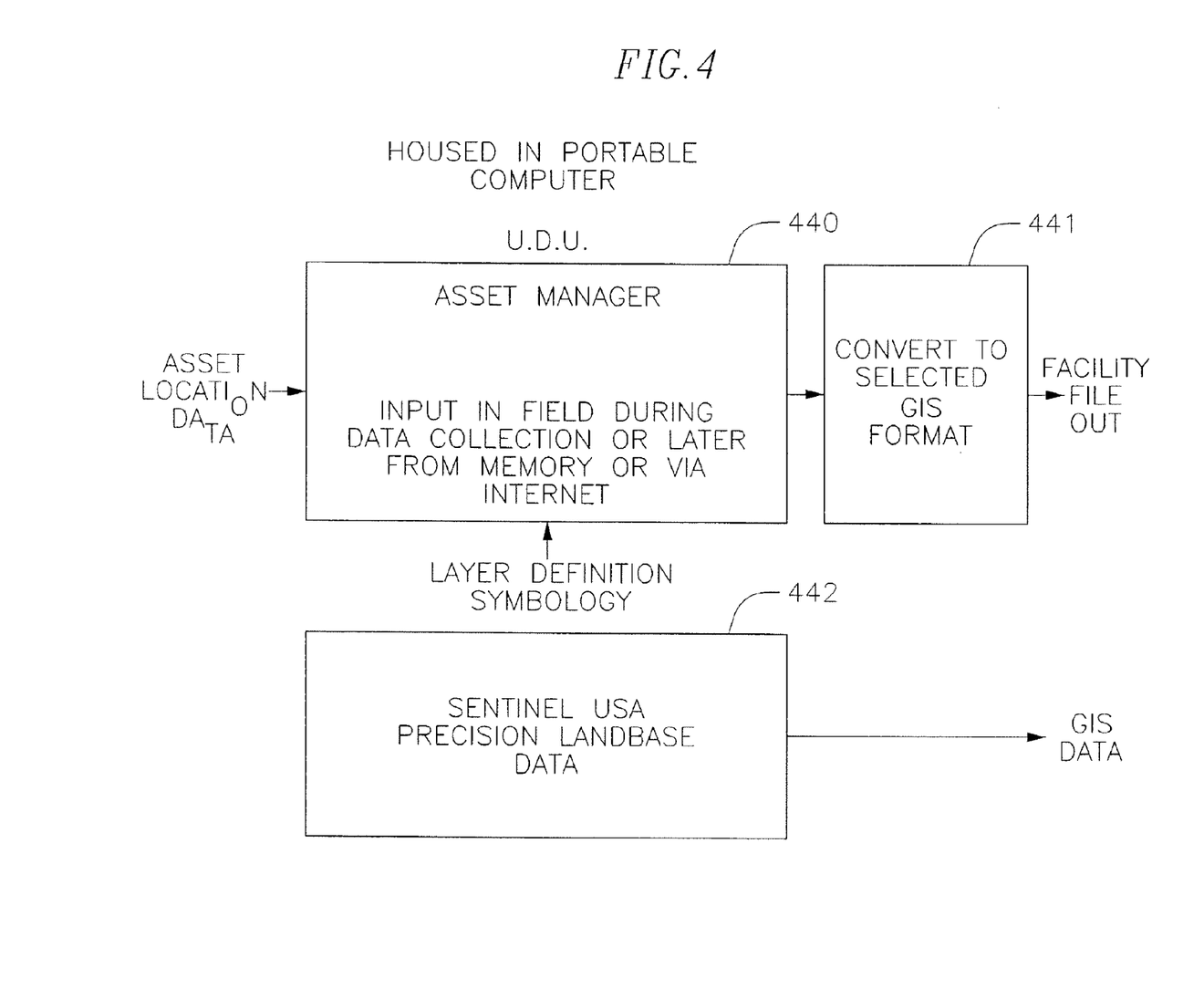
FIG. 4 is a simplified schematic block diagram of one embodiment of data manipulation, in accordance with an embodiment of the present invention.

The asset location data at the output of the apparatus of FIG. 3 may be coupled as the input to a utility designating unit 440 shown in FIG. 4. The utility designating unit 440 may be located in the field and employed at the same time as the precision asset location data is being read and recorded by the various apparatuses 311, 314, and 318 shown in FIGS. 3A, 3B and 3C of FIG. 3. The precision asset location data that is in the form of ASCII codes in designated fields has ASCII fields added in unit 440 to identify the type of utility employing symbology information from a library. A layer definition field is also added based on the type of utility that has been identified. For example, a gas pipeline is a very dangerous utility to cut into in the field while digging in the field. Consequently, gas lines are identified at a higher level than other utilities and have a greater buffer zone around the line to prevent the accidental hitting of the line in the field. The output of the utility designating unit 440 is coupled to a converter 441 that converts the data stream into a geographical information system (GIS) format. There are several major or standard formats including, for example, Autodesk, ESRI, Intergraph, GE Small World, and MapInfo. The GIS format is selected on the basis of the subsequent use of the data by a damage control unit. In addition to the information concerning the asset or utility, it is often times desirable to have the infrastructure, such as road, fences, waterways, and so forth, that are in the area mapped on a display that is being used for displaying the location of the assets. A location of the infrastructure in the GIS data should be as precise as the location of the utilities from the precise asset location data. Such precise data may be provided by SentinelUSA of Newark, Ohio and is known by the trademark Precision LandBASE Data. The file of such data is contained in the memory 442 shown in FIG. 4.

The utility designating unit 440 may also have input from the readers and recorders 321 and 323 of FIGS. 3D and 3E of FIG. 3. In this case, the asset location data will also include the error compensation signal at the output of error detectors 322 and 324. This error signal is used by the utility designating unit 440 to provide an additional buffer or area around the utility based on the degree of error that is shown by the error correction signal.

There may be, for example, two types of equipment that use the data that is provided by the utility designating unit 440 and converter 441 at a work area where the location of assets, need to be known to prevent damage to the asset and/or the equipment at the work area. One type of equipment is that used in breaking ground near above-ground assets and near underground assets. Another type of equipment that may use the data is emergency equipment, such as fire fighting equipment, where it is useful to know the location of the various utilities, such as power lines and gas lines. The use of the data will be described in connection with digging equipment at a site.

The asset location data in the form of a facility file at the output of the converter 441 may be provided to a control unit 550 (FIG. 5) that is positioned on the digging equipment (not shown) at the project site. The control unit or controller 550 may be a computer modified to include storage media, an input modem for a GPS location device and administrative modules. One acceptable lightweight, powerful and rugged computer is the Hammerhead XRT computer, which is available from WalkAbout Computers, Inc. of West Palm Beach, Fla.

Figure 5:
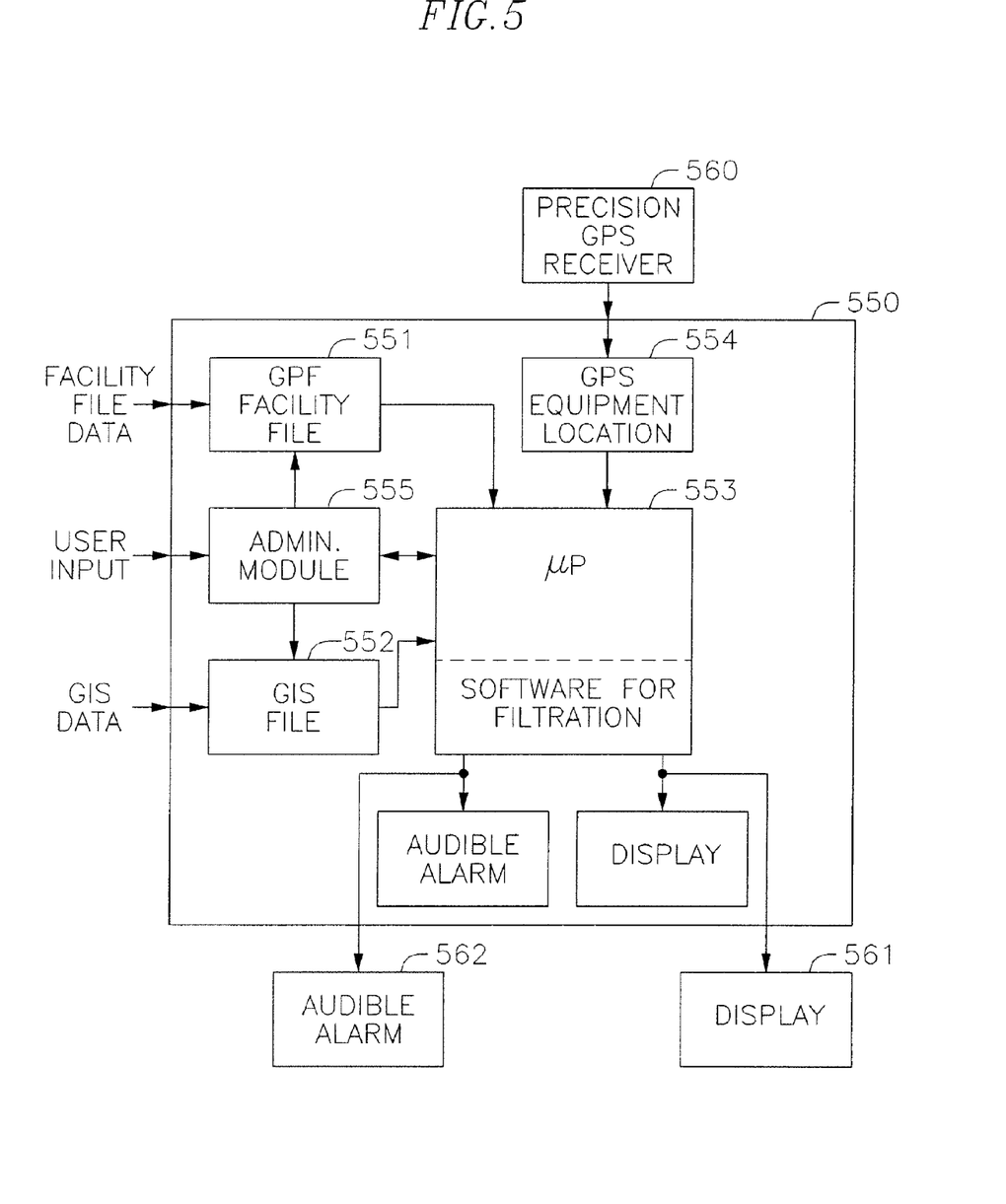
FIG. 5 is a simplified schematic block diagram of one embodiment of data usage, in accordance with an embodiment of the present invention.

The facility file may be provided by a direct coupling between the converter 441 and the controller 550 on the digging equipment. In this case the asset location data is provided to the utility designating unit 440 on the digging equipment by a memory device or by an Internet coupling or line coupling to a location where the asset location data is stored. Alternatively to the direct coupling, the facility file data may be provided on a memory medium to the controller 550 or may be transmitted to the controller 550 by way of the internet, wireless communication, or direct coupling by line to a facility where the facility file is stored for the particular project site. The controller 550 may include a facility file memory 551 and a GIS file memory 552. The controller 550 further includes a microprocessor and memory 553 that includes software for performing a unique filtration process that identifies the utilities and/or protected areas that are within the selected range of the equipment at the project site. The equipment (digger) is represented by an input modem 554 that provides the OPS location of the equipment at the project site. The OPS location of the equipment is determined by a precision GPS receiver 560 that provides its input to the controller 550 through the modem or GPS equipment location block 554.

An administration module 555 is provided in the controller 550 so that the user of the controller 550 may input control signals for the digger at the particular project site. These control signals include critical distances between identified utilities and the digging equipment for displaying alarms and for also causing audible alarms. The administration module 555 also requires a password to be entered for the user to log into the controller 550 for use at the project location. The user also inputs to the administration module 555 parameters such as the size and reach of the digging equipment and the scale for the display on the display 561. Numerous other parameters may be input to the administration module by the user at the project site. The apparatus at the project site also includes an audible alarm 562 which may be internal of the controller 550 or external of the controller 550 as shown in FIG. 5.

The microprocessor 553 of the controller 550 scans the data in the facility file 551 and displays all utilities within a selected range of the digging equipment. The selected range may be 100 feet or 1000 feet, for example. The controller 550 prevents the accidental hitting or damage to assets, such as gas pipelines, by the digging equipment by a unique filtration process which is set forth as a flow chart in FIG. 6. In Step 601 the software for filtration, which is part of the microprocessor 553, retrieves stored positional coordinates of assets and incoming GPS positional coordinates of the digging equipment. In Step 602 the filtration process compares the positional coordinates; that is, performs a cross data query in real time between the positional coordinates of the assets and the incoming GPS positional coordinates of the digging equipment. Step 603 of the filtration process includes the calculation of the distance of the assets from the equipment by the positional coordinate differences and identifies those within selected zones. The selected zones may be 10 ft., 20 ft. or 30 ft. from the digging equipment for example. In Step 604 of the process the software retrieves and scans the linear segments of each asset's data stream of the asset within the selected zone to produce target filtration records (TFR). In Step 605 of the process the software separates the target filtration record segments and orders them numerically by a calculated target distance value while continuously checking against the real time GPS positional coordinates. In Step 606 of the process the software identifies the present nearest target record (NTR) and isolates this record from the other TFRs. In Step 607 of the process, the software locks onto the linear record of the present NTR and notes the distance of this asset from the digging equipment.

Figure 6:
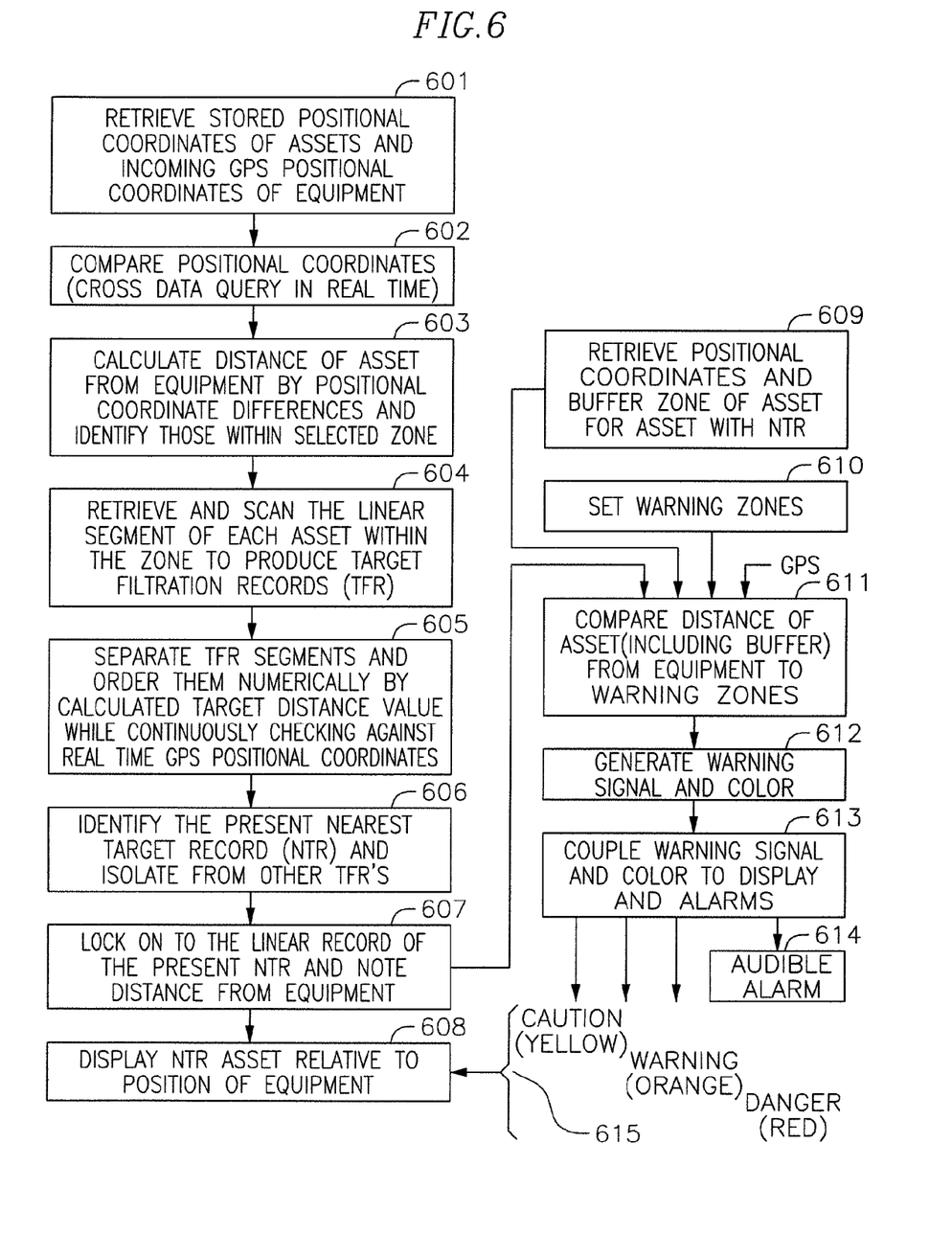
FIG. 6 is a simplified flow diagram of one embodiment of NTR, in accordance with an embodiment of the present invention.

In Step 608, the software displays the NTR asset's position relative to the position of the digging equipment on the display 561. While the NTR asset is being displayed on the display 561, the buffer distance for the identified asset is used. In Step 609 the process retrieves the positional coordinates and the buffer zone of the asset that has been identified as the nearest target record.

In Step 610, the warning zone for the particular asset is retrieved and is an input as part of Step 611. In Step 611, the distance of the asset that has been identified with the nearest target record (including the assets buffer zone) from the digging equipment is determined and compared to warning zones.

As discussed herein, the system may adjust the NTR warning process to take into account movement of the equipment and the time it takes to calculate a distance to an NTR. For example, the system could measure the amount of time it takes to performs Steps 601-610, or a portion of these Steps. Alternatively, this amount of time may be obtained in advance based on, for example, tests, simulations, estimates, etc. The system also could measure the speed and/or direction of the vehicle at any time during this process. For example, the speed and direction may be measured at one or more points in time that coincide with Steps 601-610 or at some other time during the process.

In Step 612 of the process warning signals and colors are generated. In Step 613 the warning signal and color are coupled to the display 561 (as represented by lines 615) and to the audible alarm 562. In one embodiment, the asset on the display is displayed with a flashing yellow to indicate that the asset is within the designated range for caution. As the relative distance between the asset and digging equipment decreases, the display changes to orange to inform the user that it is in the warning zone. As the distance reaches a critical point of danger, the location of the asset is indicated in a flashing red and the audible alarm signal in step 614 is created and the alarm is sounded in the audible alarm 562. For critical assets such as high pressure gas lines, when the relative distance between the asset and the digging equipment reaches the danger zone, and depending upon the system settings, the digging equipment may be automatically disabled so that no further digging may take place and there will be no damage to the asset and also to the equipment and equipment operator.

Figure 7:
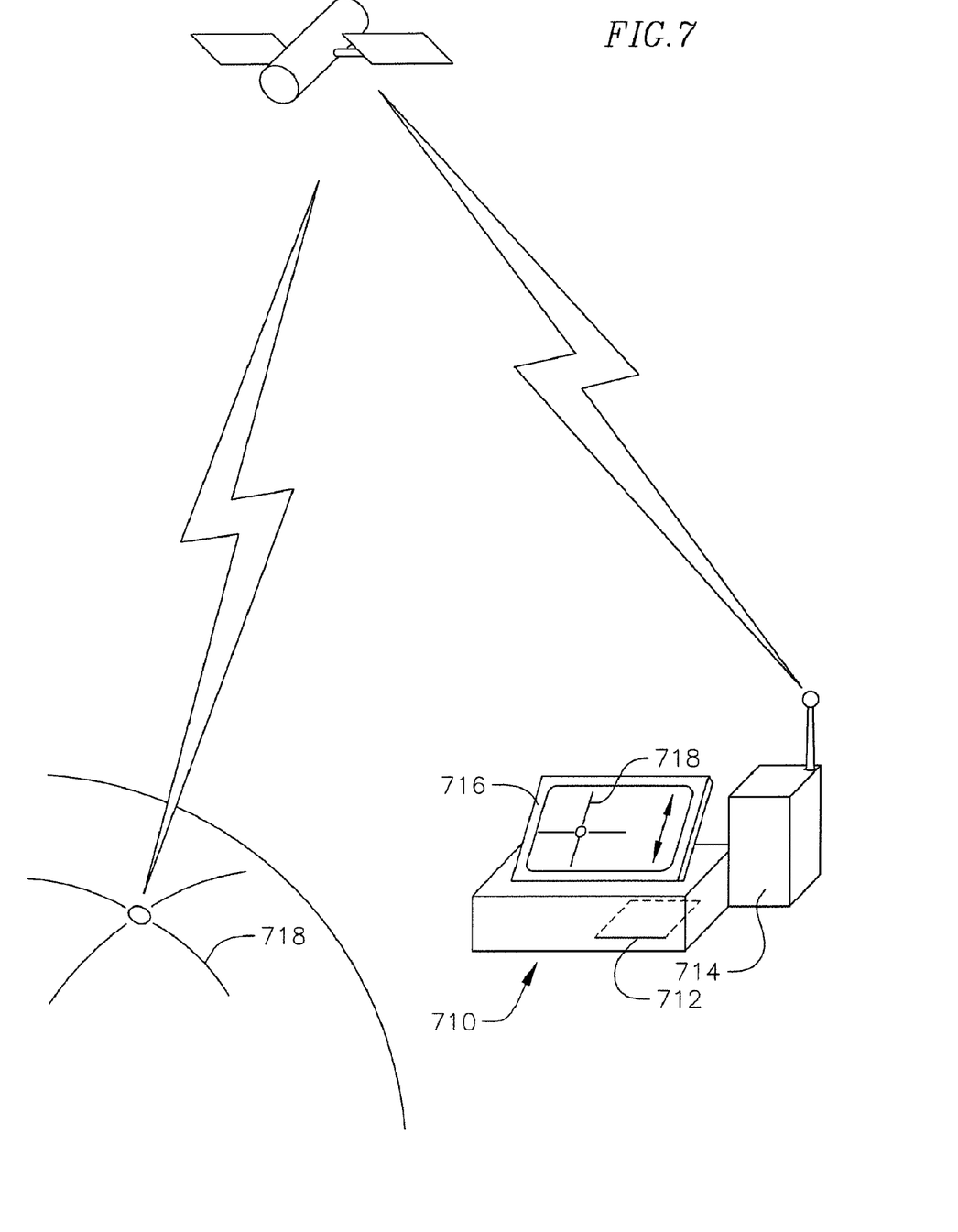
FIG. 7 is a simplified perspective view of one embodiment of system components used in a method of dynamically tracking a location of one or more selected utilities as a movement occurs within a municipal service area, in accordance with an embodiment of the present invention.
Figure 8:
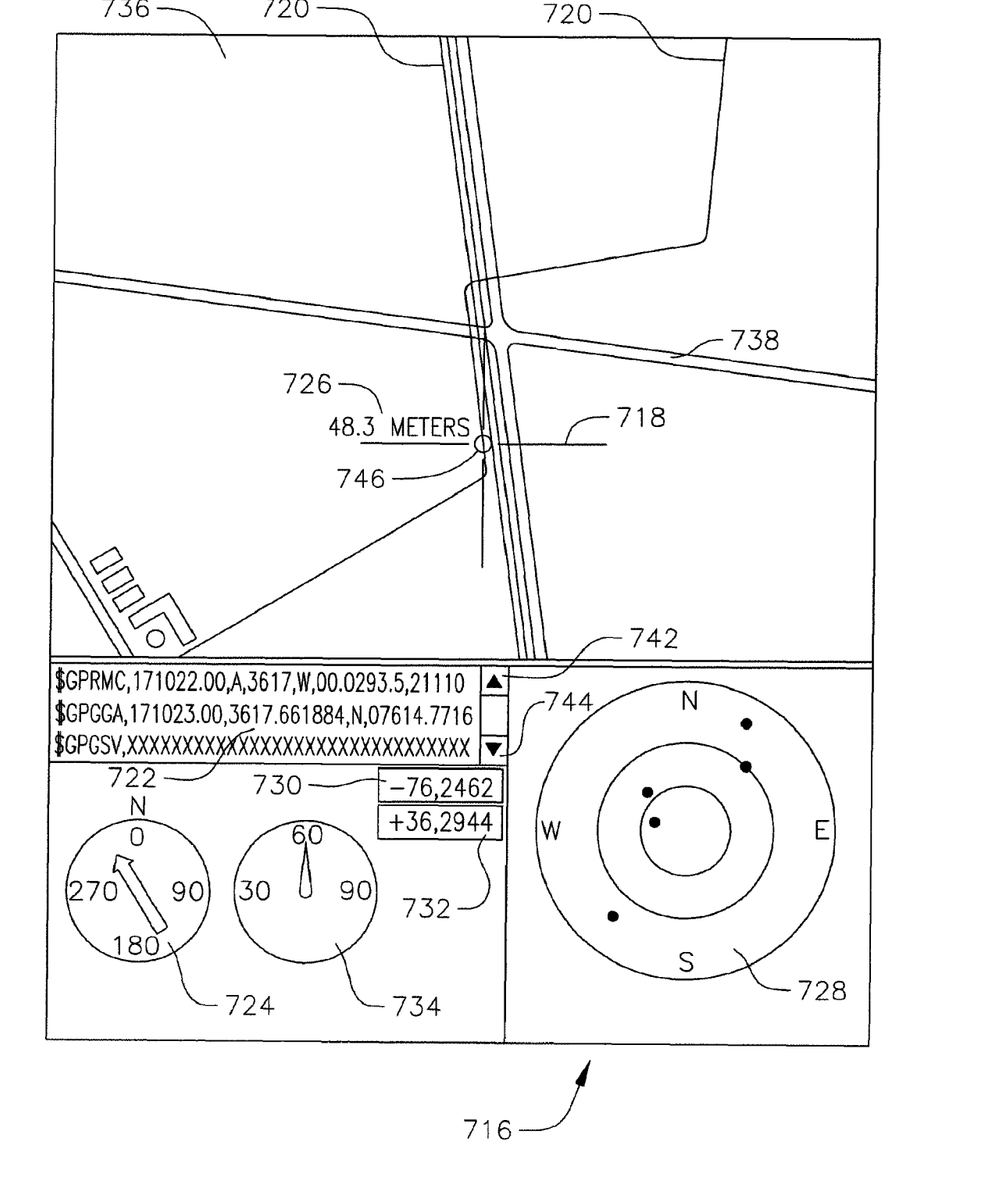
FIG. 8 is a simplified first detailed front elevation view of one embodiment of a display configured, in accordance with an embodiment of the present invention.
Figure 9:
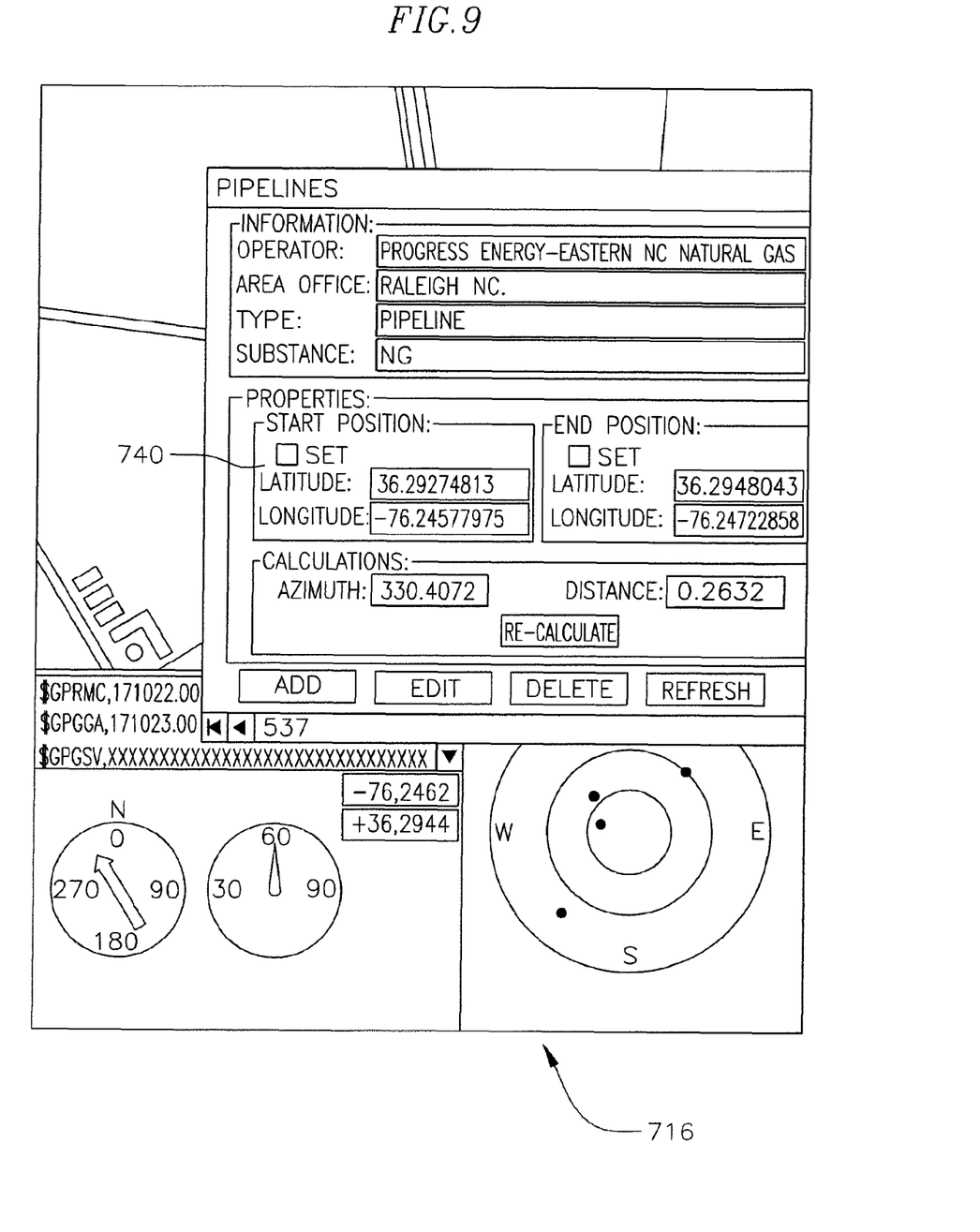
FIG. 9 is a simplified second detailed front elevation view of one embodiment of a display configured, in accordance with an embodiment of the present invention.

Referring now to FIGS. 7-9, a method of dynamically tracking a location of one or more selected utilities as a movement occurs within a municipal service area will now be described. This method is described in U.S. Pat. No. 6,798, 379, the disclosure of which is hereby incorporated by reference herein.

In FIG. 7, a first step involves: providing a portable controller, generally indicated by reference numeral 710. Controller 710 has a memory 712 and a global positioning system (GPS) co-ordinate device 714. A scrolling display 716 is also coupled to controller 710. A second step involves storing in memory 712 a series of GPS co-ordinates 718 for one or more selected utilities 720 within an assigned service area of a municipality as shown in FIG. 8. Referring to FIG. 7, a third step involves: using GPS co-ordinate device 714 to dynamically provide GPS co-ordinates 718 to controller 710 as positioning of GPS co-ordinate device 714 changes location.

Referring to FIG. 8, a fourth step involves: using scrolling display 716 to display GPS co-ordinates of GPS co-ordinate device 714 on a display 722 of global positioning system co-ordinates, together with a series of GPS co-ordinates 718 for one or more of selected utilities 720, such that the relative position of GPS co-ordinate device 714 to one or more selected utilities 718 is always known.

In FIG. 8, scrolling display 716 has a graphic indicator 724 which indicates a direction of travel for GPS co-ordinate device 714. There is also displayed a numeric indicator 726 which indicates the distance in the direction of travel before GPS co-ordinate device 714 encounters the closest of selected utilities 720. There is also a graphic indicator 728 depicting a target, which graphically indicates the positioning of satellites available to GPS co-ordinate device 714.

Also in FIG. 8, scrolling display 716 has a numeric indicator 730, which indicates longitude, and a numeric indicator 732, which indicates latitude. The display also has a graphic indicator 734, which indicates speed of travel of GPS co-ordinate device 714. Of course, when emergency crews are on foot the speed will be negligible. However, when the emergency crews are traveling in a vehicle, the speed of the vehicle will be indicated.

In FIG. 8, scrolling display 716 places GPS co-ordinates 718 in the context of a geographical map 736 with road infrastructure 738. In some embodiment the geographical map 736 may be in the form of an aerial photo.

Referring to FIG. 9, scrolling display 716 has a pop-up display screen 740 which provides vital data identifying characteristics of the closest of selected utilities 720. In the illustrated example, the utility identified is a natural gas pipeline owned by Process Energy-Eastern North Carolina Natural Gas, serviced out of a contact office in Raleigh, N.C.

One advantageous aspect is the dynamic nature of scrolling display 716, which scrolls as the GPS co-ordinates of GPS co-ordinate device 714 change. This scrolling aspect is particularly apparent when the emergency crew is approaching a site in a vehicle. The system continuously scans the GPS data it receives: first, to ascertain the position of GPS co-ordinate device 714 and second, for relative co-ordinates of utility hazards. All of the displays continually scroll and update the data with movement of GPS co-ordinate device 714. When one gets within a predetermined area of interest, a circular icon 746 appears on scrolling display 716 and locks onto the closest utility to show the point at which GPS co-ordinate device 714 will cross the utility if it continues in the same direction (FIG. 8).

Referring back to FIG. 8, scrolling display 716 may also be manually scrolled using an on screen up arrow 742 or an on screen down arrow 744, to enable the emergency crew to manually look ahead, without changing their position.

It should be appreciated that the various components and features described herein may be incorporated in a system independently of the other components and features. For example, a system incorporating the teachings herein may include various combinations of these components and features. Thus, not all of the components and features described herein may be employed in every such system.

Different embodiments of the invention may include a variety of hardware and software processing components. In some embodiments of the invention, hardware components such as controllers, state machines and/or logic are used in a system constructed in accordance with the invention. In some embodiments code such as software or firmware executing on one or more processing devices may be used to implement one or more of the described operations.

Such components may be implemented on one or more integrated circuits. For example, in some embodiments, several of these components may be combined within a single integrated circuit. In some embodiments, some of the components may be implemented as a single integrated circuit. In some embodiments, some components may be implemented as several integrated circuits.

The components and functions described herein may be connected/coupled in many different ways. The manner in which this is done may depend, in part, on whether the components are separated from the other components. In some embodiments, some of the connections represented by the lead lines in the drawings may be in an integrated circuit, on a circuit board and/or over a backplane to other circuit boards. In some embodiments, some of the connections represented by the lead lines in the drawings may comprise a data network, for example, a local network and/or a wide area network (e.g., the Internet).

The signals discussed herein may take several forms. For example, in some embodiments a signal may be an electrical signal transmitted over a wire, other signals may consist of light pulses transmitted over an optical fiber or through another medium, some signals may comprise RF signal the travel through the air. A signal may comprise more than one signal. For example, a signal may consist of a series of signals. In addition, a group of signals may be collectively referred to herein as a signal. Signals as discussed herein also may take the form of data. For example, in some embodiments an application program may send a signal to another application program. Such a signal may be stored in a data memory.

In summary, the invention described herein generally relates to an improved damage prevention system. While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

The invention claimed is:

1. A method for determining a distance of a utility asset from a moving equipment, the method comprising:
    electronically determining a first current location of the equipment;
    electronically accessing stored coordinates for a plurality of utility assets;
    selecting an area of interest including a portion of the plurality of utility assets;
    identifying local utility assets in the selected area;
    electronically determining a utility asset nearest to the first current location of the equipment, from the local utility assets;
    determining velocity and direction of the moving equipment; and
    electronically determining the distance from the nearest utility asset to a second current location of the equipment responsive to the determined velocity and direction of the equipment,
    wherein—the distance from the nearest utility asset to the second current location of the equipment (NTR) is corrected by $NTR_{correction}$, where $$NTR_{Correction} = |(\Delta t * V) \cdot (NTR)| / |(NTR)| \qquad (2)$$

where $\Delta t$ is the processing time t and V is the velocity of the equipment.

2. A system for determining a distance of a utility asset from a moving equipment comprising:
    a global position system receiver for determining a first current location and a second current location of the equipment;
    a database for storing coordinates for a plurality of utility assets;
    means for selecting an area of interest including a portion of the plurality of utility assets;
    a processor for identifying local utility assets in the selected area, determining a utility asset nearest to the first current location of the equipment from the local utility assets, determining velocity and direction of the moving equipment, determining the distance from the nearest utility asset to the second current location of the equipment responsive to the determined velocity and direction of the equipment, and adjusting the determined distance by a correction factor as a function of processing time and the determined velocity.

3. The system of claim 2, further comprising means for generating a warning signal responsive to the determined distance.

4. The system of claim 2, further comprising means for generating a plurality of warning signals responsive to the determined distance, each warning signal having a different warning level.

5. The system of claim 2, wherein the processor adjusts the distance from the nearest utility asset to the second current location of the equipment (NTR) by $NTR_{Correction}$ according to the following equation:

$$NTR_{Correction} = |(\Delta t * V) \cdot (NTR)| / |(NTR)| \qquad (2)$$

where $\Delta t$ is the processing time t and V is the velocity of the equipment.

* * * * *